United States Patent Office 3,737,460
Patented June 5, 1973

3,737,460
PRODUCTION OF SECONDARY ALKYL
PRIMARY AMINES
Robert M. Suggitt, Wappingers Falls, N.Y., assignor to
Texaco Inc., New York, N.Y.
No Drawing. Filed Nov. 6, 1970, Ser. No. 87,598
Int. Cl. C07c 85/10
U.S. Cl. 260—583 M                                13 Claims

ABSTRACT OF THE DISCLOSURE

Process for producing secondary alkyl primary amines, in particular, secondary alkyl primary amines having from 6 to 25 carbon atoms wherein a $C_6$–$C_{25}$ mono-nitroparaffin is reacted with hydrogen in the presence of a stabilized palladium-carbon catalyst where the activity and crush strength of the catalyst is enhanced and the reaction is selective in the conversion of mono-nitroparaffins to secondary alkyl primary amines.

BACKGROUND OF THE INVENTION

This invention relates to the production of amines and more particularly to the production of secondary alkyl primary amines having from 6 to 25 carbon atoms from mono-nitroparaffins.

Primary amines have previously been prepared by initially nitrating paraffins with nitric acid or nitrogen dioxide and subsequently reducing the nitroparaffin in the presence of a hydrogenation catalyst. In the hydrogenation of nitroparaffins to primary amines low temperature conditions of from 100 to 450° F. and preferably 200 to 400° F. are employed. The hydrogenation of nitroparaffins to primary amines is an exothermic reaction in which the formation of secondary amines increases at a substantial rate at temperatures above 450° F. to promote the production of primary amines at the low temperatures, some control over the reaction temperature is accomplished by permitting the reduction reaction to occur in relatively dilute organic mediums such as n-paraffins. In other instances, reactor designs have been proposed as a means to accomplish isothermal operation.

The reaction itself presents other serious obstacles insofar as permitting commercially attractive operations. As a by-product of the reaction copious amounts of water are produced which in the course of operation adversely affect presently available catalysts. The catalyst, of course, should be one possessing long term activity and selectivity along with no substantial loss in crush strength in the course of its use. In seeking such a material, many known hydrogenation catalysts have been evaluated but in one manner or other have proven themselves to be unacceptable. For example, known hydrogenation catalysts comprising nickel are customarily employed within narrow temperature ranges of from above 300 to 400° F. inasmuch as the reaction medium when maintained at temperatures below 300° F. solubilize nickel. Further, hydrogenation catalysts are customarily heterogeneous formulations in which a catalytically active Group VIII metal forms a minor component of the catalyst and is distributed on a variety of supports exemplary of which are carbon, alumina, silica and aluminosilicates. The support as a component of the heterogeneous catalyst may in many instances initially provide acceptable mechanical strength. However, inasmuch as water is a by-product of the reaction, the heterogeneous catalysts are easily softened leading to catalyst disintegration or poisoned at relatively low processing temperatures such that activity progressively declines thereby making the presently available catalysts unattractive for commercial size operations.

It is therefore an object of this invention to provide a process for converting nitroparaffins to secondary alkyl primary amines.

Another object of this invention is to provide a process for converting mono-nitroparaffins to secondary alkyl primary amines in high yields employing as catalyst therefore a composition that is not adversely affected by water and possessing high selectivity, stabilized activity and good crush strength.

Other objects and advantages will become apparent from a reading of the following detailed description of the invention.

SUMMARY OF THE INVENTION

Broadly, this invention contemplates a process for producing secondary alkyl primary amines which comprises reacting a secondary mono-nitroparaffin having from 6 to 25 carbon atoms with hydrogen at a temperature of from about 100 to 450° F. under hydrogen pressures of from about 10 to 300 atmospheres in the presence of a stabilized palladium-carbon catalysts, said catalyst stabilized by heating for at least one hour at a temperature of from 500 to 1200° F. in the presence of a non-oxidizing gas. In a highly preferred embodiment, the palladium-carbon catalyst is stabilized by heating at a temperature of from 700 to 1100° F. for a period of 2 to 8 hours in the presence of hydrogen.

In accordance with this invention, the stabilized catalysts employed in the process comprise from about 0.1 to 10.0 weight percent palladium, preferably 0.5 to 2.0 weight percent palladium, supported on a base of activated carbon. Activated carbons as a component of the heterogeneous catalyst represent a class of known materials that are customarily prepared from coal, petroleum coke, animal or vegetable material. The raw material is first carbonized by heating at temperatures of from about 600 to 1200° F. in a non-oxidizing atmosphere and thereafter activated in a flow of superheated steam or steam containing a minor amount of air at temperatures of 1200 to 1700° F. In addition to increasing the pore volume and surface area, this activating treatment introduces oxygen to the carbon surface which is held in various forms generally described as surface oxides. Such partially oxidized carbon surfaces are hydrophilic and beneficially permit the wetting of the activated carbon with aqueous solutions of palladium.

In a specific embodiment of this invention, it is preferred that the activated carbons possess an ash content below 5 weight percent and particularly below 2 weight percent. Activated carbons having ash contents below 5 weight percent represent a class of commercially available materials known as water treating agents and absorbents for low molecular weight hydrocarbon gases. The ash content of activated carbon is determined by burning the carbon at glowing red heat leaving an inorganic oxide residue composed of silicon, aluminum, iron, calcium and magnesium along with, in some instances, trace amounts of titanium, sodium, nickel and vanadium. As is also known, the activated carbon can be acid treated with, for example, hydrochloric acid to provide ash contents of below 2% where the predominant inorganic oxide residue is silica. In general, the activated carbons described above and employed as catalyst supports herein are conveniently provided in pelleted or extruded form. The activated carbon forming the support for the heterogeneous catalyst stabilized as described herein is one having high surface areas typically from about 800 to 1400 square meters per gram.

To prepare the heterogeneous stabilized catalyst, the activated carbon is impregnated with an aqueous solution of a palladium metal salt, most conveniently palladium chloride or palladium nitrate, and after thorough mixing and drying at temperatures of 200 to 250° F. a catalytically active palladium on carbon composition is recovered.

The palladium-carbon catalyst prepared above while initially possessing high catalytic activity and crush strength when employed as the catalyst for the reduction of nitroparaffins to amines progressively loses activity within short periods of time on being exposed to reaction by-product water. It has now been found that heat treating the palladium-carbon catalyst for periods of at least one hour and up to 24 hours, preferably from 2 to 8 hours, at temperatures ranging from 500 to 1200° F., preferably between 700 and 1100° F., in a non-oxidizing atmosphere provides the catalyst with stabilized activity and prolonged crush strength. It is believed that the treatment reduces and removes surface oxides and renders the catalyst more hydrophobic. A plurality of non-oxidizing environments can be used including such gases as nitrogen, methane, argon, helium, neon, ethane and propane. In a highly preferred embodiment, the non-oxidizing atmosphere is an environment of hydrogen or mixtures of hydrogen and light hydrocarbons, the latter atmosphere being available from, for example, a catalytic reforming unit off-gas. The preferred environment, namely, a reducing atmosphere of hydrogen has been found to give rise to superior catalysts possessing prolonged and increased catalytic activity during use in the course of the conversion reaction contemplated herein which produces copious amounts of by-product water. That is, the reaction is selective toward the production of secondary alkyl primary amines with minimal formation of undesired secondary alkyl secondary amines. In general, the heat treatment in a non-oxidizing atmosphere is conducted under environment pressures of from 0 to 1000 p.s.i.g. and preferably 300 to 700 p.s.i.g. Conversely, oxidizing conditions such as the presence of air or oxygen during the heat treatment leads to rapid softening of the catalyst prior to use and deactivation when employed in the instant reaction where water is a by-product.

A convenient method of treating the palladium-carbon catalyst to stabilize the same is to pass a gaseous stream of non-oxidizing gas over and through a bed of the catalyst at the temperatures and pressures recited above where the gas is introduced at the rate of at least 50 standard cubic feet per hour per square foot of reactor cross section over a period of at least one hour and preferably 2 to 8 hours.

In the instant invention, the stabilized catalyst described above is employed in a process for producing secondary alkyl primary amines by reacting a mono-nitroparaffin having from 6 to 25 carbon atoms with hydrogen. Mono-nitroparaffins contemplated in this process constitute secondary nitro-n-paraffins in which nitro group is randomly positioned along the carbon chain on other than a terminal carbon atom. Illustrative mono-nitroparaffins include 2 or 3-nitrohexane, 2,3 or 4-nitroheptane, 2,3 or 4-nitrooctane, 2,3,4 or 5-nitrodecane, 2,3,4,5 or 6-nitroundecane, 2,3,4,5 or 6-nitrododecane, 2,3,4,5,6 or 7-nitrotridecane, 2,3,4, 5,6 or 7-nitrotetradecane, 2,3,4,5,6,7,8 or 9-nitrooctadecane and mixtures thereof, for example, mixtures of $C_{10}$–$C_{14}$ nitroparaffins. The applicable mono-nitroparaffins are prepared by contacting a $C_6$–$C_{25}$ paraffin hydrocarbon, preferably a straight chain hydrocarbon, in a liquid phase with a vaporous nitrating agent such as nitrogen dioxide or nitric acid at a temperature ranging from about 250 to 500° F. at from 1 to 20 atmospheres.

The illustrative nitration reaction briefly outlined above whether the performed batchwise or in continuous manner is generally permitted to proceed until about 5 to 50% of the paraffin has been converted yielding a crude nitrated product of about 5 to 45% of mono-nitroparaffin and 95 to 50% of unreacted paraffin along with lesser amounts of $C_6$–$C_{25}$ ketone, alcohol, carboxylic acid and polyfunctionals. The mono-nitroparaffin so prepared may, if desired, be separated and recovered from the crude product as by distillation and subsequently hydrogenated to the corresponding amine, the reaction conveniently undertaken in the presence of a $C_6$–$C_{25}$ paraffin hydrocarbon diluent. Alternatively, crude material may be hydrogenated directly wherein the unreacted paraffin constitutes the reaction medium. The crude nitrated product may also be caustic washed with, for example, sodium bicarbonate, ammonium hydroxide, sodium hydroxide or potassium hydroxide to remove acid by-products following nitration and prior to hydrogenation. Where the nitroparaffin feedstock is provided substantially free of acid by-products or contaminants neutralization may be omitted. In one embodiment, the nitroparaffins are reduced to secondary alkyl primary amines in the presence of the stabilized palladium-carbon catalyst at temperatures of from about 100 to 450° F. and preferably between 200 and 400° F. under hydrogen pressures ranging from 10 to 300 atmospheres and preferably 20 to 40 atmospheres. The reaction is exothermic in nature and temperatures exceeding 450° F. are deleterious to the formation of primary amines. At temperatures above 450° F., formation of undesirable secondary amine is substantially increased. The proportions of nitroparaffin to catalyst are not critical and the optimum proportions are readily determined by experiment. In general, the higher the ratio of catalyst to nitroparaffin the more rapid the reaction.

The process described above is applicable to batchwise or continuous operations. Suitable reactors may be charged and pressurized, agitation preferably being provided, and the reaction allowed to proceed and controlled by hydrogen pressure. Alternatively, continuous operations may be employed where the nitroparaffin is permitted to pass through and over the catalyst in the presence of hydrogen and under conditions of temperature and pressure mentioned above and space velocities ranging from about 0.2 to 20 v./v./hr.

Conventional recovery procedures may be employed in recovering the amine as by distilling the crude reaction product by stepwise fractionation. Alternatively, the amine may first be converted and recovered as an amine salt by reaction with an inorganic acid followed by further treatment of the amine salt with alkali and thereafter recovering the primary amine by distillation. Amines produced according to this process may be employed as mold release agents, emulsion freeze-thaw stabilizers, pigments dispersing agents, polyurethan catalyst and anti-caking anti-dusting agents. Their uses are also indicated as corrosion inhibitors, deleterious bacteria control agents, sludge dispersants and as detergents and de-icers in gasolines.

The process for producing secondary alkyl primary amines detailed above after a period of prolonged on-stream time may cause the catalyst to become partially deactivated. Regeneration of the catalyst is easily undertaken by again contacting the palladium-carbon catalyst with a stream of non-oxidizing gas, preferably hydrogen, under the conditions of temperature and time recited for initial stabilization such that the catalyst activity is restored. Initial heat treatment and subsequent regeneration may be carried out in situ within the conversion reactor.

In order to more fully illustrate the nature of this invention and manner of practicing the same, the following examples are presented. In these examples, the best mode contemplated for carrying out the invention is set forth.

EXAMPLE I

A composite of palladium on activated carbon was prepared by dissolving 10 grams of palladium chloride in 100 cc. of water, 100 cc. of concentrated ammonium hydroxide and 400 cc. of methyl alcohol and adding the resulting solution to 594 grams of commercially available ⁵⁄₃₂" extruded activated carbon pellets at about 32° F. and gently stirring the mixture for one hour. The solids were thereafter recovered by filtration and dried at 135° F. for 16 hours and subsequently at 220° F. for 6 hours in a stream of nitrogen. A catalyst composed of 574 grams of 0.97 weight percent palladium on activated carbon was recovered.

A 54 gram sample of the above catalyst was heat treated in a 1″ diameter reactor at 450° F. for 4 hours in a stream of hydrogen flowing at the rate of 1–2 cubic feet per hour at 600 p.s.i.g. and labelled Catalyst A.

Two additional 54 gram samples of catalyst were heated to 1050° F. for 4 hours in a stream of hydrogen flowing at the rate of 1–2 cubic feet per hour at 600 p.s.i.g. and labelled Catalysts B and C.

A $C_{10}$–$C_{14}$ feedstock composed of 14.6 weight percent nitrated n-paraffin, 82.1 weight percent n-paraffin, 0.4 weight percent ketone and 2.9 weight percent difunctional paraffin was introduced at the rate of 100 grams per hour into a hydrogenation reactor containing 54 grams of Catalyst A and into another hydrogenation reactor containing 54 grams of Catalyst B, each reactor maintained at a temperature 275° F. and 600 p.s.i.g. of hydrogen. Product analysis after 60 hours on stream employing Catalyst A showed that this catalyst had lost 11% of its activity between the 12th and 48th hour on stream. Under the same operating conditions Catalyst B demonstrated its stabilized activity by remaining within 4% of its activity over a period of 12 to 48 hours in converting the nitroparaffin to primary amine.

The $C_{10}$–$C_{14}$ nitrated n-paraffin feedstock was introduced into a hydrogenation reactor containing 54 grams of Catalyst C maintained at a temperature of 275° F. and a hydrogen pressure of 600 p.s.i.g. at a hydrogen flow rate of 1.5 to 2.0 cubic feet per hour where the feed was introduced at the rate of 130 grams per hour. After a period of 80 hours on stream Catalyst C showed no deactivation.

EXAMPLE II

A composite of palladium on activated carbon was prepared by dissolving 6.7 grams of palladium chloride in 70 cc. of water to which was added 100 cc. of concentrated ammonium hydroxide and 240 cc. of methyl alcohol. This solution was added to 490 grams of commercially available activated carbon ⅛ inch pellets having an ash content of 3.51%. The mixture was gently stirred for one hour at 32° F. and the solids were thereafter recovered by filtration and dried at 220° F. for 4 hours in a stream of nitrogen. The catalyst composed of 0.92 weight percent palladium basis chemical analysis on activated carbon was recovered and labelled Catalyst D. The crush strength of this catalyst was 14.3 pounds and was determined by measuring the force required to crack the catalyst pellet between two parallel plates as force is applied slowly.

A 57 gram sample of Catalyst D was heat treated in a one inch diameter reactor at 500° F. for 2 hours in a stream of hydrogen flowing at the rate of 1½ to 2 cubic feet per hour at 600 p.s.i.g. and labelled Catalyst E.

Another 58 gram sample of Catalyst D was heated at 950° F. for 2 hours in a stream of hydrogen flowing at the rate of 1 to 2 cubic feet per hour at 600 p.s.i.g. and labelled Catalyst F.

A $C_{10}$–$C_{14}$ feedstock as in Example I was introduced at the rate of 125 cc. per hour into a hydrogenation reactor containing 60 grams of Catalyst D and into another reactor containing 57 grams of Catalyst E each reactor maintained at a temperature of 275° F. and 600 p.s.i.g. of hydrogen. Product analysis of the feed contacted with Catalyst D showed that this catalyst rapidly deactivated with time on stream and lost 11% of its activity between the 8th and 28th hour on stream. Product analysis of the feed contacted with Catalyst E showed that this catalyst did not lose activity after 40 hours on stream.

Catalyst F, 58 grams, was similarly evaluated with a feedstock introduced at 125 cc./hour and 275° F. Catalyst F evidenced no deactivation with time on stream and analysis of the product demonstrated the catalyst's high selectivity in that 9.7 millequivalents of primary amine per gram of product was produced along with no significant amount of secondary amine. When the processing conditions with Catalyst F were changed to 225° F. and 60 cc./hour liquid flow, high conversion was again obtained with no deactivation with time-on-stream. The crush strength of Catalysts E and F subsequent to their recorded use above were respectively 20 and 16 pounds.

EXAMPLE III 1800 grams of commercially available activated carbon pellets measuring ⅛ inch in diameter having an ash content of 3.51 percent were mixed with 5 liters of a solution prepared by mixing 3 volumes of concentrated hydrochloric acid with 7 volumes of water. After digesting the material for 2 days at 140° F. the solution was filtered from the activated carbon and the solids thoroughly washed until the wash water was free of chloride ion. The ash content of the dried acid washed carbon was 1.37 weight percent which consisted predominantly of silica along with lesser amounts of iron, magnesium, calcium and titanium.

To the dried activated carbon, there was added 25.7 grams of palladium chloride in 200 cc. of concentrated ammonium hydroxide along with 140 cc. of water and 1000 cc. of methyl alcohol. After thoroughly agitating the mixture, the recovered solids were dried at 140° F. in a stream of nitrogen. A sample of the catalyst was subsequently heat treated at 700° F. in a stream of nitrogen for 4 hours at atmospheric pressure. The catalytic material possessed a palladium content of 1.08 weight percent and had a crush strength of 20 pounds.

A $C_{10}$–$C_{14}$ feedstock as in Example I was introduced at the rate of 88 cc. per hour into a reactor containing 41 grams of the catalyst maintained at a temperature of 210–220° F. and 600 p.s.i.g. of hydrogen. Product analysis showed 4.4 milliequivalents of primary amine per gram of product and 0.0 milliequivalent of secondary amine. Increasing the reactor temperature to 280–290° F. and the feed rate to 140 cc. per hour resulted in a product analysis of 5.3 milliequivalents of primary amine and 0.2 milliequivalent of secondary amine.

Another sample of the catalyst heat treated at 700° F. under nitrogen was further heat treated at 950° F. for 2 hours in a stream of hydrogen flowing at the rate of 1–2 cubic feet per hour at 600 p.s.i.g. The aforementioned $C_{10}$–$C_{14}$ feedstock was introduced at the rate of 85 cc. per hour into a reactor containing 40 grams of the catalyst maintained at 210–220° F. and 600 p.s.i.g. of hydrogen. Product analysis showed 5.0 milliequivalents of primary amine per gram of product and 0.1 milliequivalent of secondary amine. Increasing the reaction temperature to 280–290° F. and the feed rate to 140 cc. per hour resulted in a product analysis of 6.7 milliequivalents of primary amine and 0.2 milliequivalent of secondary amine.

Another 400 gram sample of the catalyst heat treated at 700° F. under nitrogen was introduced to a reactor such that the bed depth was 10 inches and the feedstock was introduced at a volume hourly space velocity of 0.50, hydrogen introduced at 10 cubic feet per hour, hydrogen pressure of 580 p.s.i.g. and a temperature of 300–350° F. The reaction was conducted over a period of 6 weeks and gave the following results. At the end of the first week, product analysis showed 9.4 milliequivalents of primary amine and 0.9 milliequivalent of secondary amine; second week 9.3 milliequivalents of primary amine and 0.5 milliequivalent of secondary amine; third week 9.4 milliequivalents of primary amine and 0.4 milliequivalent of secondary amine; sixth week 8.9 milliequivalents of primary amine and 0.4 milliequivalent of secondary amine. As can be seen, the heat treatment provided the catalyst with prolonged activity and selectivity toward converting the nitroparaffin to primary amine with minimal formation of secondary amine. After six weeks of use as described above, the catalyst surprisingly possessed an increased crush strength of 22.7 pounds and had a high selectivity toward secondary alkyl primary amines in that 92% of the nitroparaffin converted formed primary amine.

EXAMPLE IV

Another catalyst was prepared as described in Example III and was analyzed to contain 0.97 weight percent palladium on an activated carbon having 1.84% ash content other than palladium and a surface area of 1,288 square meters per gram. 337 grams of this catalyst which had been heat treated with nitrogen at 700° F. was placed in a hydrogenation reactor and a $C_{10}$–$C_{14}$ n-paraffin feedstock as in Example I was introduced at a feed rate of 1.1 volumes of liquid feed per volume of catalyst per hour under a hydrogen pressure of 600 p.s.i.g. with a flow of hydrogen of 10 cubic feet per hour. The catalyst's initial crush strength was measured at 18 pounds and after being employed for a period of 804 hours was determined to have a crush strength of 19.7 pounds. From the data summarized below, it will be seen that the catalyst remained active over the 804 hour period of operation with the primary amine production remaining constant, the secondary amine formation decreasing which in fact resulted in a higher selectivity towards primary amine.

| Hours | Primary amine | Secondary amine |
| --- | --- | --- |
| 6 | 8.9 | 1.1 |
| 12 | 9.1 | 0.9 |
| 24 | 9.2 | 0.7 |
| 36 | 9.3 | 0.7 |
| 72 | 9.2 | 0.7 |
| 114 | 8.9 | 0.6 |
| 246 | 9.0 | 0.6 |
| 390 | 9.2 | 0.5 |
| 525 | 9.2 | 0.6 |
| 804 | 8.9 | 0.5 |

After 804 hours of operation, introduction of the nitroparaffin feedstock was interrupted and the catalyst was heated in situ within the reactor in a stream of hydrogen flowing at the rate of 10 cubic feet per hour at 600 p.s.i.g. and 900° F. for a period of 4 hours. This treatment served to regenerate the catalyst by removing deposits thereon. The regenerated catalyst was thereafter contacted with the feedstock under the conditions described above and from the data summarized below it will be seen that the regenerated catalyst was not only more active after regeneration but also possessed superior selectivity in that increased production of primary amine and less secondary amine resulted after a comparable time on stream. The data reported in the tables represents milliequivalents of primary amine and secondary amine per gram of product.

| Hours | Primary amine | Secondary amine |
| --- | --- | --- |
| 6 | 9.2 | 0.9 |
| 12 | 9.7 | 0.5 |
| 24 | 9.8 | 0.4 |
| 36 | 9.8 | 0.4 |

EXAMPLE V

Two catalysts composed of respectively 1% palladium on activated carbon and 1% platinum on activated carbon were heat treated to 900° F. in a stream of 2 cubic feet per hour of hydrogen for 3 hours at 600 p.s.i.g. 20 gram samples (50 cc.) of each catalyst were charged to separate hydrogenation reactors and a feedstock containing 16 weight percent $C_{10}$–$C_{14}$ nitroparaffin in a $C_{10}$–$C_{14}$ n-paraffin was introduced at the rate of 30 cc. per hour into the reactors along with 1.8 cubic feet of hydrogen per hour at conversion conditions of 600 p.s.i.g. of hydrogen and an inlet reactor temperature of 300° F. The conversion was permitted to proceed over a period of 24 hours. Analysis of the products from each reactor demonstrated the higher selectivity of the palladium catalyst toward the formation of secondary alkyl primary amines in that this catalyst provided 8.3 milliequivalents of primary amine per gram of product whereas the platinum catalyst produced 4.8 milliequivalents of primary amine. Moreover, the platinum catalyst produced twice the amount of secondary amine product as compared to the palladium catalyst. In terms of total equivalence expressed as primary amine, the palladium catalyst was more active in that it produced 11.1 milliequivalents of primary amine as compared to 10.4 milliequivalents of primary amine produced by the platinum catalyst.

EXAMPLE VI

Other catalyst evaluations were conducted wherein hydrogenation of a $C_{10}$–$C_{14}$ nitroparaffin feedstock as described in Example I was contacted with a commercially available ⅜₁₆ inch pelleted nickel on kieselguhr catalyst at temperatures ranging from 360 to 195° F. Solubilized nickel was detected in the reactor effluent in significant amounts at reaction temperatures below 300° F. and the elution of nickel increased rapidly as the temperature of the reaction was lowered progressively to 195° F. illustratively, at the following reaction temperatures the respective concentrations of nickel in p.p.m. were detected in the product: 360° F.—less than 1, 325° F.—1, 300° F.—1, 220° F.—14 and 195° F.—31.

In another evaluation 755 grams (620 cc.) of nickel on kieselguhr catalyst was contacted at temperatures ranging from 315 to 385° F. with a feed composed of $C_{10}$–$C_{14}$ nitroparaffin as in Example I at a feed rate of 3.7 pounds per hour and a hydrogen pressure of 600 p.s.i.g. where hydrogen was introduced at the rate of 10 cubic feet per hour. The milliequivalents of secondary alkyl primary amine and secondary alkyl secondary amine after prolonged periods on stream were:

| Hours | Primary amine | Secondary amine |
| --- | --- | --- |
| 63 | 8.9 | 0.66 |
| 96 | 8.6 | 0.5 |
| 144 | 7.8 | 0.57 |
| 207 | 7.0 | 0.5 |
| 258 | 6.6 | 0.5 |

As can be seen under conditions favorable for little or no solubilization of nickel in the amine product, the activity of the catalyst was steadily reduced.

Another noble metal catalyst consisting of 0.6 weight percent platinum on eta-alumina having a crush strength of 16 pounds was employed in the hydrogenation of a $C_{10}$–$C_{14}$ nitroparaffin feedstock as in Example I which was introduced at the rate of 94 cc. per hour at reaction conditions of 225° F., 600 p.s.i.g. of hydrogen pressure and a liquid hourly space velocity of 1.0. After 108 hours on stream, the crush strength of the catalyst was 3 pounds.

I claim:

1. A process for producing secondary alkyl primary amines which comprises reacting a secondary mono-nitroparaffin having from 6 to 25 carbon atoms with hydrogen at a temperature of from about 100 to 450° F. and under a pressure of from about 10 to 300 atmospheres in the presence of a stabilized palladium-carbon catalyst, said catalyst stabilized by heating for at least one hour at a temperature of from 500 to 1200° F. in the presence of a non-oxidizing gas.

2. A process according to claim 1 wherein said secondary mono-nitroparaffin is reacted at a temperature of from 200 to 400° F.

3. A process according to claim 1 wherein said pressure is from 20 to 40 atmospheres.

4. A process according to claim 1 wherein said secondary mono-nitroparaffin has from 10 to 14 carbon atoms.

5. A process according to claim 1 wherein said secondary mono-nitroparaffin is a mixture of said nitroparaffins having from 10 to 14 carbon atoms.

6. A process according to claim 1 wherein said non-oxidizing gas is nitrogen.

7. A process according to claim 1 wherein said non-oxidizing gas is hydrogen.

8. A process according to claim 1 wherein said catalyst is stabilized at a temperature of from 700 to 1100° F. for a period of 2 to 8 hours.

9. A process according to claim 1 wherein said carbon has an ash content of below 5.0 weight percent.

10. A process according to claim 1 wherein said carbon has an ash content of below 2.0 weight percent.

11. A process according to claim 1 wherein said reacting is conducted at space velocities ranging from about 0.2 to 20 v./v./hr.

12. A process according to claim 1 wherein said palladium is present in said catalyst in an amount of from 0.1 to 10.0 weight percent.

13. A process according to claim 1 wherein said palladium is present in said catalyst in an amount of from 0.5 to 2.0 weight percent.

References Cited

UNITED STATES PATENTS

| | | | |
|---|---|---|---|
| 3,470,250 | 9/1969 | Patterson et al. | 260—583 M |
| 3,226,442 | 12/1965 | Bonetti et al. | 260—583 M |
| 2,823,235 | 2/1958 | Graham et al. | 260—583 M X |

LEWIS GOTTS, Primary Examiner

R. L. RAYMOND, Assistant Examiner

U.S. Cl. X.R.

252—472